(12) United States Patent  
Kamensky et al.

(10) Patent No.: US 8,151,076 B2  
(45) Date of Patent: Apr. 3, 2012

(54) MAPPING MEMORY SEGMENTS IN A TRANSLATION LOOKASIDE BUFFER

(75) Inventors: Victor Kamensky, Fremont, CA (US); Ilya Umansky, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 727 days.

(21) Appl. No.: 12/080,614

(22) Filed: Apr. 4, 2008

(65) Prior Publication Data

US 2009/0254728 A1 Oct. 8, 2009

(51) Int. Cl.  
*G06F 13/00* (2006.01)

(52) U.S. Cl. .......................... 711/170; 711/154

(58) Field of Classification Search .................. 711/154, 711/170  
See application file for complete search history.

(56) References Cited

U.S. PATENT DOCUMENTS

| 5,317,705 | A | 5/1994 | Gannon et al. |
| 5,784,707 | A * | 7/1998 | Khalidi et al. ............... 711/206 |
| 6,629,111 | B1 | 9/2003 | Stine et al. |
| 7,003,647 | B2 * | 2/2006 | Jacobs et al. ............... 711/207 |
| 7,944,452 | B1 * | 5/2011 | Wietkemper et al. ........ 345/566 |
| 2002/0108025 | A1 * | 8/2002 | Shaylor ........................ 711/203 |
| 2006/0212675 | A1 * | 9/2006 | Sartorius et al. ............. 711/205 |
| 2009/0182942 | A1 * | 7/2009 | Greiner et al. ............... 711/119 |

* cited by examiner

*Primary Examiner* — Reba I Elmore  
(74) *Attorney, Agent, or Firm* — Cindy Kaplan

(57) ABSTRACT

In one embodiment, a method includes identifying first and second memory segments associated with a process in virtual memory, allocating memory for the first memory segment from a first contiguous physical memory space, allocating memory for the second memory segment from a second contiguous physical memory space, and mapping the first and second memory segments to the first and second contiguous physical memory spaces in a translation lookaside buffer. Apparatus and logic for memory allocation to minimize translation lookaside buffer faults are also disclosed.

17 Claims, 4 Drawing Sheets

MAPPING MEMORY SEGMENTS IN A TRANSLATION LOOKASIDE BUFFER

BACKGROUND OF THE INVENTION

The present disclosure relates generally to memory allocation, and more particularly, to minimizing Translation Lookaside Buffer (TLB) faults.

TLB is a cache that is used by memory management hardware to improve the speed of virtual address translation. Virtual address space in virtual memory is associated with an address range that is typically much larger than that of physical memory. The virtual memory address range starts at a base address and ends at an upper boundary address. This virtual memory address range is divided into pages, which may correspond during the execution of an application to various physical addresses. A virtual page number is mapped to a physical page number using the TLB. A lookup in a TLB table is performed to translate a virtual address to a physical address. If a valid TLB entry is found then its content is used to produce a physical address. If no TLB entry is found or the entry is not valid then a TLB fault (exception) is generated.

During normal operation in conventional systems, many processes are created and destroyed dynamically. This results in physical memory remap and reassignment each time the new process is created or requires additional dynamic memory. The process memory is built from available system memory pages which are not necessarily sequential. As a result, conventional systems may comprise many virtual pages, each requiring a slot in the TLB table in order to be translated into physical memory. Since the TLB size is typically limited (e.g., 64 entries), all of the pages cannot fit into the TLB. Thus, every time address translation is requested and the page is not found in the TLB, a TLB exception is generated. Handling of TLB exceptions may be very costly.

DESCRIPTION OF EXAMPLE EMBODIMENTS

Overview

Figure 1:
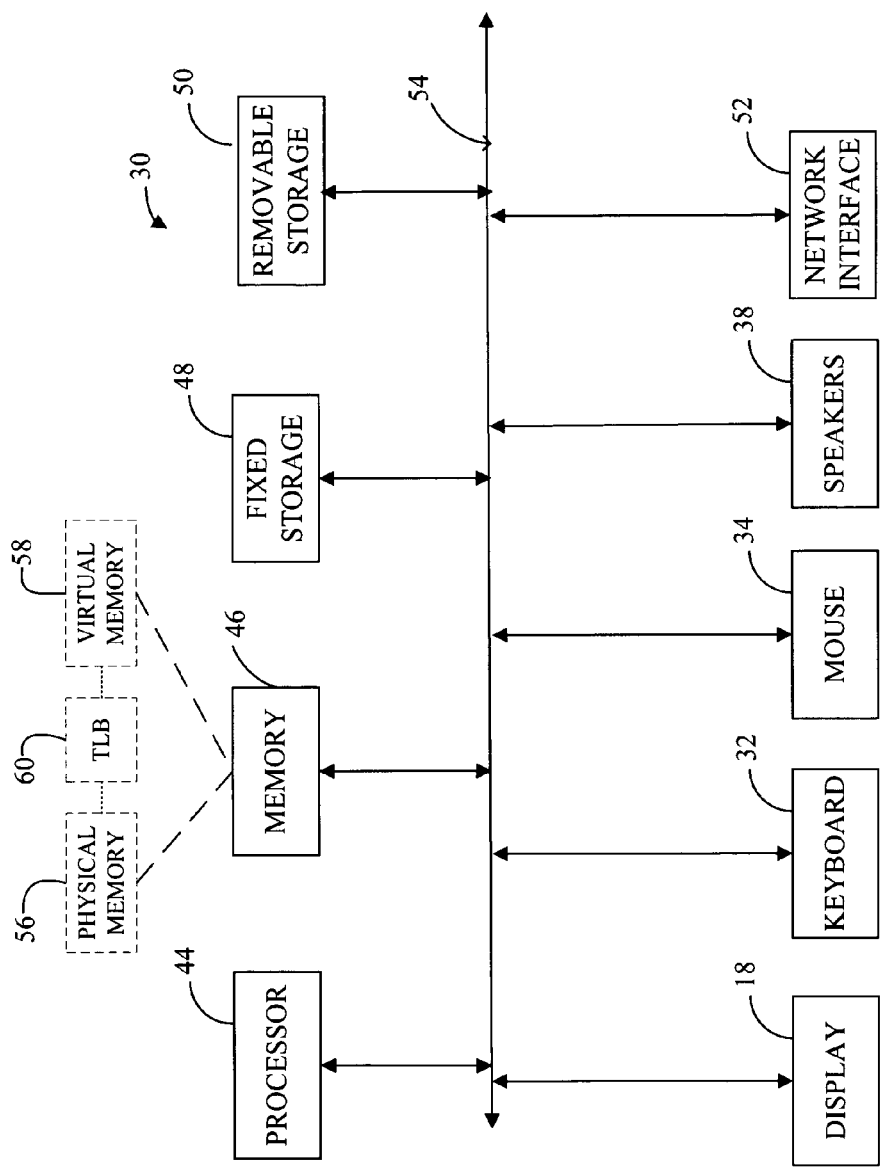
FIG. 1 is a block diagram of a computer system that may be used to implement embodiments described herein.

A method, apparatus, and logic for memory allocation to minimize translation lookaside buffer faults are disclosed.

In one embodiment, the method generally comprises identifying first and second memory segments associated with a process in virtual memory, allocating memory for the first memory segment from a first contiguous physical memory space, allocating memory for the second memory segment from a second contiguous physical memory space, and mapping the first memory segment to the first contiguous physical memory space and the second memory segment to the second contiguous physical memory space in a translation lookaside buffer.

Example Embodiments

The following description is presented to enable one of ordinary skill in the art to make and use the invention. Descriptions of specific embodiments and applications are provided only as examples, and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Many computer systems include both physical memory and virtual memory. When a processor accesses virtual memory, a virtual address must be translated to the corresponding physical address. A Translation Lookaside Buffer (TLB) is used to improve the speed of virtual address translation. Virtual memory is typically organized as a collection of entries that form pages representing memory. In order to access virtual memory, a processor (e.g., CPU (Central Processing Unit)) searches the TLB for the virtual page number of the page that is being accessed in a TLB lookup. If a TLB entry is found with a matching virtual page number, a TLB hit occurs and the CPU can use the data stored in the TLB entry to calculate the target physical address. If there is no TLB entry with a matching virtual page number, the CPU raises a TLB fault (exception). The TLB exception may be passed on to the operating system, which may then attempt to handle the exception by making the required page accessible at a location in real memory.

Handling of TLB exceptions can be very costly. Thus it is desirable to minimize the number of TLB faults, especially in real time systems since interrupt processing is typically stopped for the period of TLB fault resolution. A method and system described herein provide a set of constraints that reduce or eliminate TLB faults. A reduction in TLB faults provides an improvement in system performance. The architecture described herein may be used in a computer system such as described below with respect to FIG. 1. The system may be implemented in embedded systems such as in a router or switch, other network devices, or any other computer system utilizing a TLB.

Referring now to the drawings and first to FIG. 1, an example of a computer system 30 that may be used to implement embodiments described herein is shown. The computer system 30 includes one or more input devices (e.g., keyboard 32, mouse 34) which may include one or more buttons for interacting with a GUI (Graphical User Interface), and one or more output devices (display 18, speakers 38). Computer system 30 further includes subsystems such as processor 44, system memory 46, fixed storage 48 (e.g., hard drive), removable storage 50 (e.g., CD-ROM drive), and network interface 52. Logic may be encoded in one or more tangible media for execution by the processor 44. For example, system memory 46 and storage 48, 50 can be utilized to store and retrieve software programs incorporating computer code that implements aspects of the invention, data for use with the invention, and the like. Memory 46 may be volatile (e.g., RAM), nonvolatile (e.g., ROM, flash memory), or a combination thereof. Computer storage media may also include DVDs or other optical storage, magnetic cassettes, tape, or disk storage, or any other medium that can be used to store information which can be accessed by the computer. Other computer systems suitable for use with the invention may include additional or fewer subsystems. For example, computer system 30 may include more than one processor 44 (i.e., a multi-processor system) or a cache memory. As described in detail below, the memory 46 includes physical memory 56, virtual memory 58, and TLB 60, which maps the virtual memory addresses to physical memory addresses.

The system bus architecture of computer system 30 is represented by arrows 54 in FIG. 1. However, these arrows are only illustrative of one possible interconnection scheme serving to link the subsystems. For example, a local bus could be utilized to connect the central processor 44 to the system memory 46. It is to be understood that the computer system 30 shown in FIG. 1 is only one example of a computer system suitable for use with the invention. Other computer architectures having different configurations of subsystems may also be utilized without departing from the scope of the invention.

Figure 2:
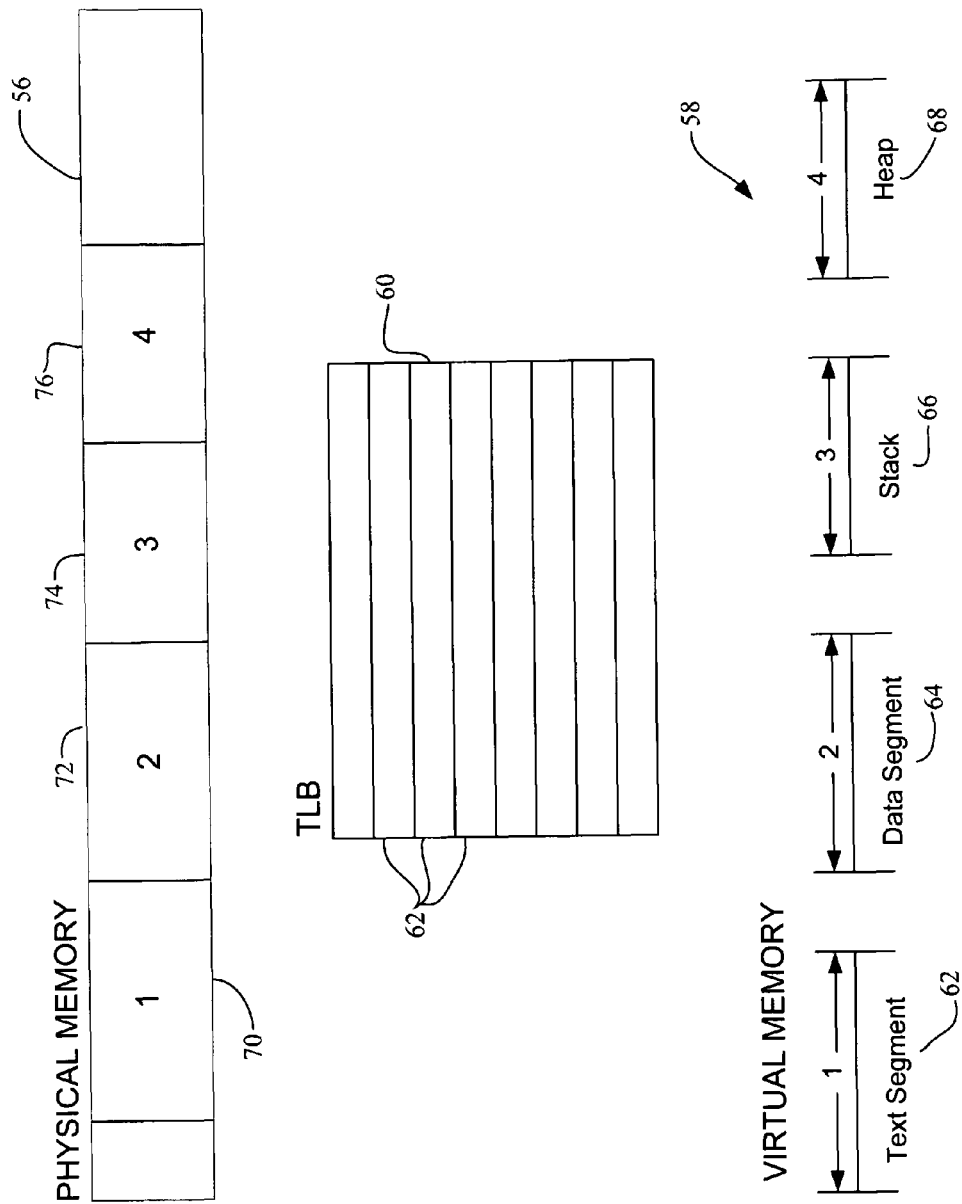
FIG. 2 is a diagram illustrating memory allocation in one embodiment of a memory management system.

FIG. 2 illustrates an example of a memory allocation system arranged to minimize the number TLB faults. The TLB 60 is formed of a plurality of page table entries 62 that map virtual memory, generally indicated at 58, to a particular location in physical (real) memory 56. During execution of an application, the application may access code, text, or data that is grouped together in a memory segment. Each memory segment is loaded and stored in one or more pages in physical memory. Once loaded, each page is accessed by a virtual address via a corresponding entry in the TLB. During runtime, a memory segment is accessed by its virtual address. The processor generates a virtual address which is converted to a physical address using the TLB. If a virtual address access is successful in the translation lookaside buffer, then the corresponding memory location in the physical memory 56 may be accessed and read or written to.

In one embodiment, each entry 62 in the TLB 60 corresponds to a page. Each entry 62 associates a virtual address of a page in virtual memory 58 with a corresponding physical address in physical memory 56. The page size may range, for example, from 4K to 64M, and is preferably between 16M and 64M.

The system described herein manages the allocation of memory segments from the virtual memory 58 in the physical memory 56. In one embodiment memory is allocated for specific types of memory segments from contiguous and properly aligned physical memory space, as illustrated in FIG. 2. In the example shown in FIG. 2, the virtual memory 58 comprises a text segment (code segment) 62, data segment 64, stack 66, and heap 68. Each memory segment shown in FIG. 2 is identified with a label (text segment label 1, data segment label 2, stack label 3, and heap label 4). The corresponding memory allocation in physical memory 56 is shown for each segment. For each process in the system, memory is allocated for text segment (1) from contiguous and properly aligned physical memory space 70, memory is allocated for data segment (2) from contiguous and properly aligned physical memory space 72, and memory is allocated for dynamic data segments (stack and heap) (3 and 4) from contiguous and properly aligned physical memory spaces 74 and 76, respectively. In a preferred embodiment, the contiguous memory spaces are fit into a minimum number of pages by using the biggest possible page sizes that a given system allows. Once the memory is allocated, the virtual address may then be mapped to a physical address via the TLB, as described in detail below.

In one embodiment, all processes are started early enough so that contiguous physical memory is available. Also, dynamic creation/destruction of the processes is preferably avoided since it may lead to unpredictable physical memory partitioning and fragmentation. If dynamic starts and stops of the processes cannot be avoided, the contiguous and properly aligned physical memory required for these dynamic processes is preferably precalculated and reserved. Once the dynamic process is started, it will reside in this precalculated and reserved memory. The dynamic memory size of a process is preferably statically limited and completely allocated upfront since addition of pages dynamically may lead to discontinuity of the memory and result in additional number of pages being required.

The execution of non-process code (e.g., kernel code) typically does not involve TLB memory translation, and therefore, does not need to be constrained in accordance with the above-described memory allocation process.

The embodiments described herein help to minimize required number of pages in the system and therefore result in constant TLB content if all pages can fit into the TLB. Gradual performance degradation is relative to the amount of entries in excess of the TLB size. Thus, even if there is some excess in number of pages, the scheme can still be utilized to minimize the number of TLB faults for a given system.

Figure 3:
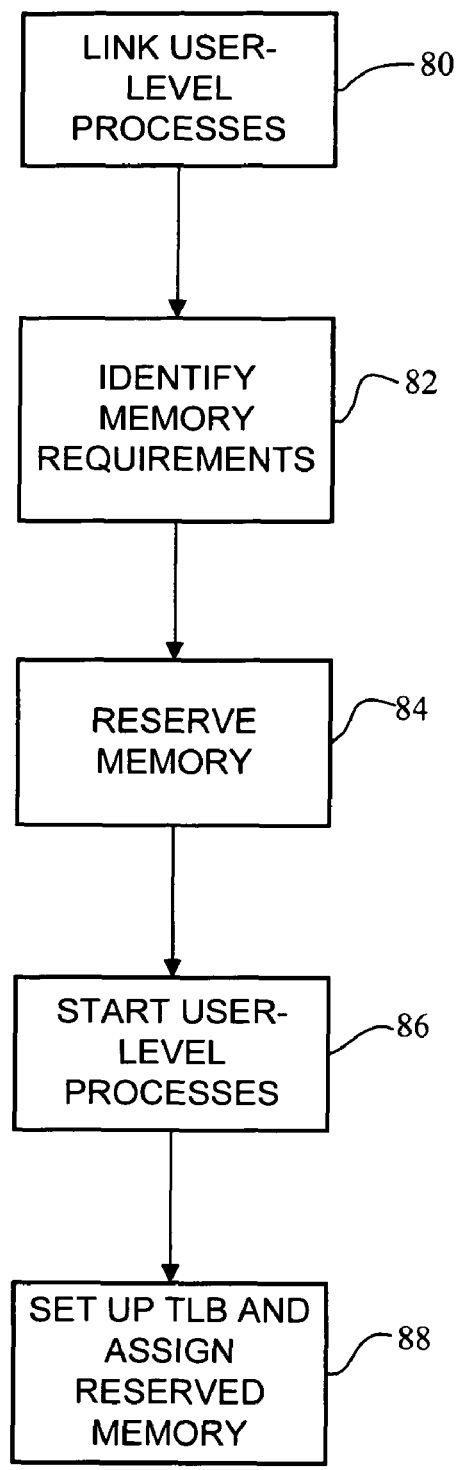
FIG. 3 is a flowchart illustrating a process for setting up a Translation Lookaside Buffer (TLB) in accordance with one embodiment.

FIG. 3 is a flowchart illustrating an overview of a process for setting up a TLB in accordance with one embodiment. At step 80, user-level (user land) processes are linked. Memory requirements are identified based on the segment sizes (step 82). Kernel run-time memory reservations are made at step 84. User-level processes are started at step 86. At step 88, kernel assigns reserved memory and the TLB is set up.

Figure 4:
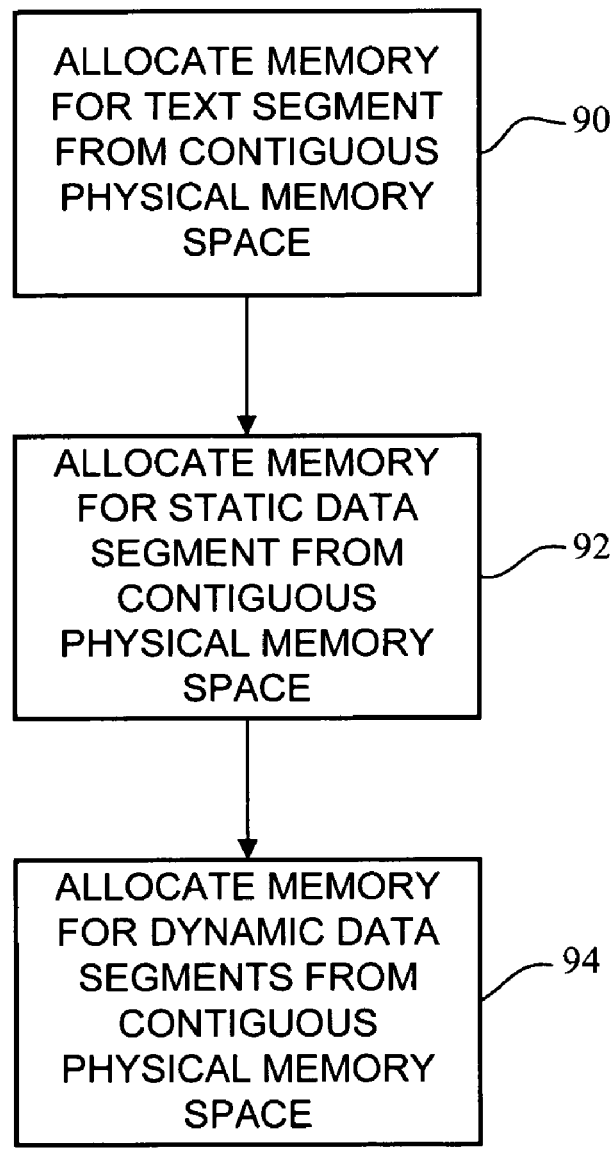
FIG. 4 is a flowchart illustrating a process for allocating memory in physical memory in accordance with one embodiment.

FIG. 4 is a flowchart illustrating details of memory allocation for the TLB setup in step 88 of FIG. 3. At step 90, memory is allocated for the text segment from contiguous physical memory space. At step 92, memory is allocated for the static data segments. Memory is then allocated for the dynamic data segments at step 94. As previously discussed, the contiguous memory spaces are fit into a minimum number of pages using maximum page sizes. Since the entire memory segment for each segment type (e.g., text, static data, stack heap) is allocated from a continuous physical memory space, memory fragmentation and partitioning is reduced. The above steps are performed for each process in the system. As previously discussed, the memory allocation is performed at the start of static processes so that contiguous physical memory is available. For dynamic processes, memory is allocated up front before the start of the process.

It is to be understood that the processes shown in FIGS. 3 and 4 are only examples and that steps may be removed, added, or reordered, without departing from the scope of the invention. For example, the memory may be allocated to the segments in a different order than shown in FIG. 4.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:
1. A method comprising:
reserving a plurality of memory segments in a continuous physical memory space;
starting one or more processes;
identifying first and second memory segments associated with said one or more processes in virtual memory;
allocating memory for said first memory segment from a first contiguous physical memory space in said continuous physical memory;
allocating memory for said second memory segment from a second contiguous physical memory space in said continuous physical memory; and
mapping said first memory segment to said first contiguous physical memory space and said second memory seg- ment to said second contiguous physical memory space in a translation lookaside buffer;

wherein each of said memory segments is stored in one or more pages in said physical memory, each of said pages allocated for one of said memory segments, and wherein allocating memory comprises utilizing a maximum page size.

2. The method of claim 1 wherein one of said first and second memory segments comprise a text segment and the other of said first and second memory segment comprises a data segment.

3. The method of claim 1 further comprising identifying a third memory segment in said virtual memory and allocating memory for said third memory segment from a third contiguous physical memory space.

4. The method of claim 3 wherein said third memory segment comprises a dynamic data segment.

5. The method of claim 1 wherein said memory allocation is performed upon starting said process.

6. The method of claim 1 further comprising identifying one or more memory segments associated with a dynamic process and allocating memory from another contiguous physical memory space before said dynamic process is started.

7. An apparatus comprising:

a processor configured to reserve a plurality of memory segments in a continuous physical memory space, start one or more processes, identify first and second memory segments associated with said one or more processes in virtual memory, allocate memory for said first memory segment from a first contiguous physical memory space in said continuous physical memory, allocate memory for said second memory segment from a second contiguous physical memory space in said second continuous physical memory, and map said first memory segment to said first contiguous physical memory space and said second memory segment to said second contiguous physical memory space in a translation lookaside buffer; and memory for storing said translation lookaside buffer;

wherein each of said memory segments is stored in one or more pages in said physical memory, each of said pages allocated for one of said memory segments, and wherein allocating memory comprises utilizing a maximum page size.

8. The apparatus of claim 7 wherein said one of said first and second memory segments comprise a text segment and the other of said first and second memory segment comprises a data segment.

9. The apparatus of claim 7 wherein the processor is configured to identify a third memory segment in said virtual memory and allocate memory for said third memory segment from a third contiguous physical memory space.

10. The apparatus of claim 7 wherein mapping of additional memory segments to physical memory space exceeds said translation lookaside buffer capacity.

11. The apparatus of claim 7 wherein said memory allocation is performed upon starting said process.

12. The apparatus of claim 7 wherein said processor is configured to identify one or more memory segments associated with a dynamic process and allocate memory from another contiguous physical memory space before said dynamic process is started.

13. Logic encoded in one or more tangible media for execution and when executed operable to:

reserve a plurality of memory segments in a continuous physical memory space;

start one or more processes;

identify first and second memory segments associated with said one or more processes in virtual memory;

allocate memory for said first memory segment from a first contiguous physical memory space in said continuous physical memory;

allocate memory for said second memory segment from a second contiguous physical memory space in said continuous physical memory; and map said first memory segment to said first contiguous physical memory space and said second memory segment to said second contiguous physical memory space in a translation lookaside buffer;

wherein each of said memory segments is stored in one or more pages in said physical memory, each of said pages allocated for one of said memory segments, and wherein allocating memory comprises utilizing a maximum page size.

14. The logic of claim 13 wherein one of said first and second memory segments comprise a text segment and the other of said first and second memory segment comprises a data segment.

15. The logic of claim 13 wherein said memory allocation is performed upon starting said process.

16. The logic of claim 13 further operable to identify one or more memory segments associated with a dynamic process and allocate memory from another contiguous physical memory space before said dynamic process is started.

17. The logic of claim 13 further operable to identify a dynamic data segment in said virtual memory and allocate memory for said dynamic data segment from a third contiguous physical memory space.

\* \* \* \* \*